Aug. 7, 1928.
A. H. BRANDON
1,679,929
AUTOMATIC VIBRATING POWER SHUT-OFF
Filed Sept. 7, 1926  2 Sheets-Sheet 1
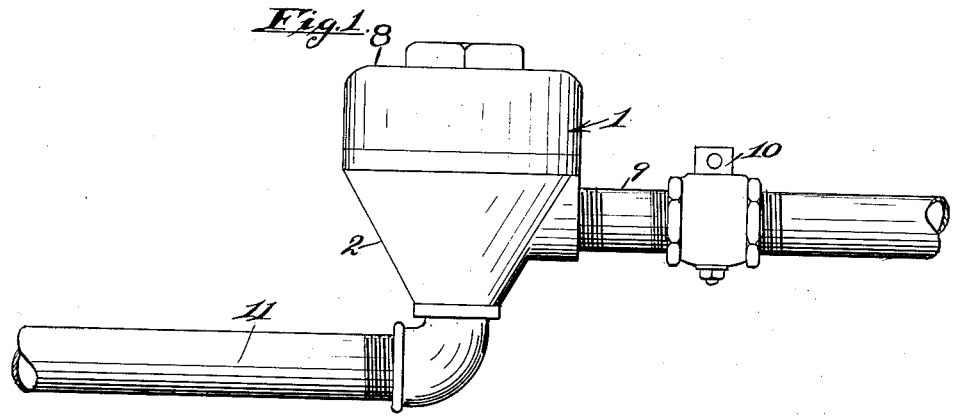
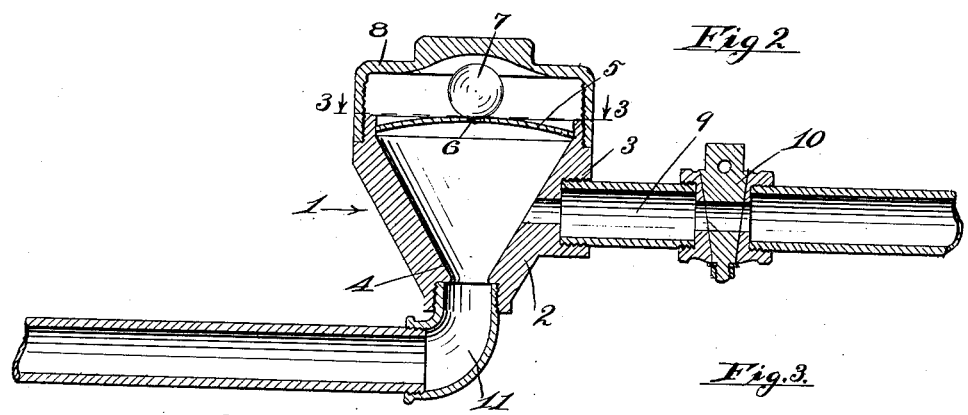
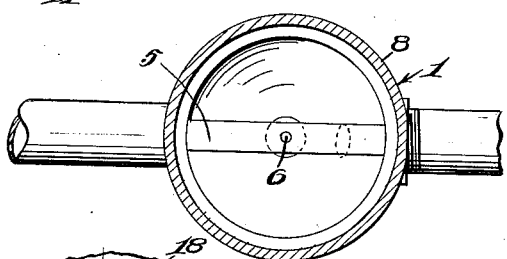
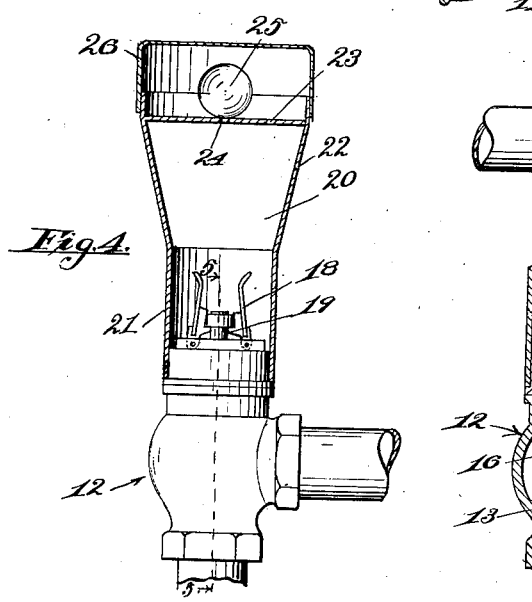
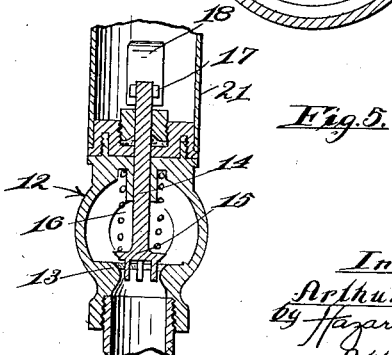

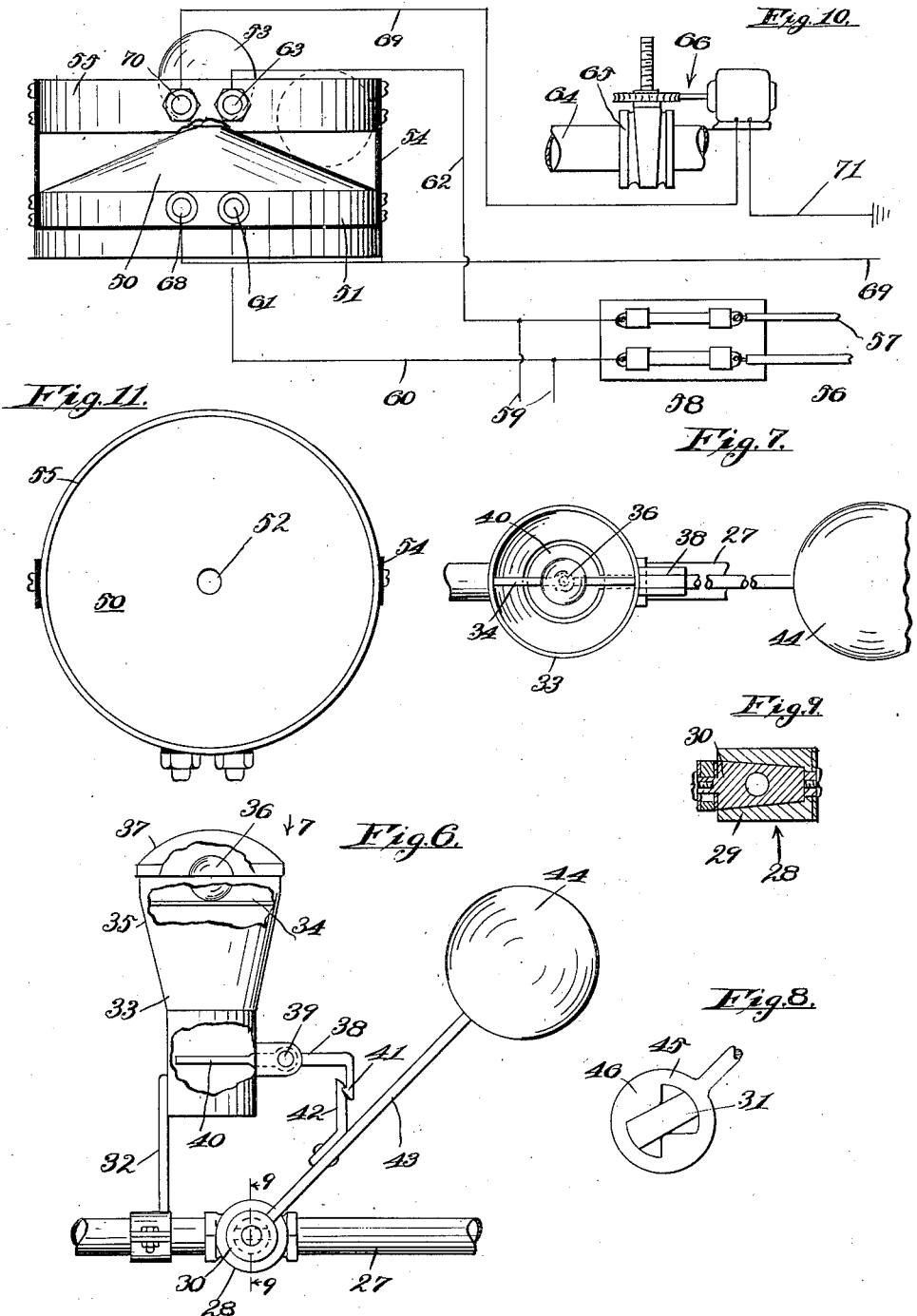

Patented Aug. 7, 1928.

1,679,929

UNITED STATES PATENT OFFICE.

ARTHUR H. BRANDON, OF LOS ANGELES, CALIFORNIA.

AUTOMATIC VIBRATING POWER SHUT-OFF.

Application filed September 7, 1926. Serial No. 134,075.

My invention is an automatic vibrating power shut-off, to shut off sources of power in the case of earthquakes, explosions or other violent disturbances.

In earthquakes or explosions or similar violent disturbances, very frequently a great deal of the damage is caused by escaping gas which becomes ignited causing fires, the various electric circuits becoming broken and starting fires. Also the water service is frequently broken so that such a quantity of water escapes that there is insufficient quantity and pressure to properly fight any fires which have been started by the prior mentioned or other sources.

My invention comprehends broadly an arrangement for shutting off sources of power whether these be gas, electric or water, when there are violent disturbances such as earthquakes, explosions, or other severe vibrations sufficient to cause damage.

There are a number of ways in which this may be accomplished, a simple way to shut off a gas or water supply is by mounting a ball on a bridge or the like above the valve structure to be closed by a ball and when there is a violent vibration the ball is shaken off the bridge and falls downwardly into the valve, closing the valve seat.

Another arrangement to close a valve is by suspending a ball on a bridge and on the vibration allowing this to drop and trip a trigger device which may close a valve either by the valve having a counter-weight or being spring actuated. A simple way to close an electric circuit is by mounting a ball on an elevated device so that it will be shaken off of same when the vibration is sufficient, the ball rolling into position to short circuit the main electric wires and thus fuse the fuses leading into a house or other place where a fire may be ignited. Such a device may also be utilized to close an electric circuit to operate an electric control power valve to shut off gas and water service.

Some types of appliances embodying my invention are disclosed in the accompanying drawings, in which;

Figure 1 is a side elevation of a vibratory shut-off valve for a fluid service which may be liquid or gas;

Fig. 2 is a longitudinal section of Fig. 1;

Fig. 3 is a horizontal section of Fig. 2 on the line 3—3 in the direction of the arrows;

Fig. 4 is a side elevation partly broken away, showing another type of vibratory shut-off for controlling a valve by releasing triggers, this may be utilized for liquid or gaseous service shut-off;

Fig. 5 is a vertical section on the line 5—5 of Fig. 4;

Fig. 6 is a side elevation partly broken away, showing another type of trigger release valve for liquid or gaseous power shut-off, in which a valve is closed by a moving counter-weight;

Fig. 7 is a plan view of Fig. 6 in the direction of the arrow 7;

Fig. 8 is an enlarged detail of the connection of the counter-weight arm and the valve, showing the free movement of the counter-weight before it starts to turn the valve;

Fig. 9 is a cross section on the line 9—9 of Fig. 6;

Fig. 10 is an elevation with diagrammatic circuits, showing an electric service shut off and an electric control for liquid or gaseous service pipes.

Fig. 11 is a top plan view of Fig. 10, the ball being omitted.

Considering first the construction of Figs. 1, 2 and 3, a vibratory valve shut-off is indicated generally by the numeral 1 which is formed of a conical valve structure 2 having an inlet opening 3 at the side, the lower part 4 forming a valve seat. A bridge 5 extends across the upper part of the conical valve structure and has preferably a central aperture 6 on which the ball 7 is centered. A cap or cover 8 is secured to the upper part of the conical valve structure, the whole structure being liquid and gas-tight. An inlet pipe 9 is connected to the inlet opening and preferably has a control valve 10 therein. The outlet pipe 11 is connected to the lower part of the valve.

The manner of functioning of the vibratory shut-off valve above described is substantially as follows:

The ball and the valve structure 2 are preferably made of non-corrodible metal if the valve is designed for service with illuminating or heating gas, or of other suitable materials which will not deteriorate when left uninspected year after year. The structure is preferably mounted in relation to the service pipes and the ball is placed on the bridge resting in the aperture. The size of the aperture may be regulated by reaming same to a desired size so that a slight or a violent vibration is required to unseat the ball. It will be noted that the bridge is comparatively narrow so that when the ball is unseated it falls downwardly in the conical valve structure, closing against the valve seat 4 and thus making a shut off for either gas or liquid service.

In the construction of Figs. 4 and 5, a valve structure 12 is shown as having a valve seat 13 with a slidable valve stem 14 with a valve disc 15 on the lower end to bear against the seat. A spring 16 is normally tensioned to force the valve disc against the seat, this spring surrounding the stem and bearing against the valve disc and the upper part of the valve. The stem extends upwardly through packing and has a head 17 secured to the upper end. A pair of pivotally mounted triggers 18 having detents 19 thereon engage underneath the head 17.

A ball cage 20 is formed of any suitable structure, this being illustrated as having a cylindrical portion 21 connected to the upper end of the valve and a conical portion 22 thereabove. A bridge 23 having a central aperture 24 is positioned in the upper part of the cage, the ball 25 being seated on the bridge and centered in the aperture. The cage is preferably closed with a closure cap 26.

The manner of operation and functioning of the shut-off of Figs. 4 and 5 is substantially as follows:

It will be understood that the cage may be readily removed from the valve and allow the plunger to be pulled upwardly by clasping the head with a suitable implement and when raised sufficiently high the triggers are pressed inwardly so that the detents engage underneath the head. The cage is then put in place and the ball mounted on the bridge, the aperture being designed of the proper size to allow unseating of the ball either with mild or violent vibrations according to the size of the opening, this being ascertained empirically. The cap or cover is then placed on the cage.

When a building structure or the like having this type of installation in place is shaken by an earthquake, explosion or other disturbance, the ball is shaken off the bridge and falling downwardly strikes between the triggers, forcing same apart and thereby releasing the valve stem from the detents and allowing the valve to be closed by the spring. This type of shut-off is suitable for either gas or liquid service.

In the construction of Figs. 6 to 9, the service pipes are indicated by the numeral 27 and have a shut off valve 28 of the ordinary character. In this valve the outer sleeve is indicated by the numeral 29 forming the seat and having a tapered rotary valve element 30 therein with a passage through same. The valve is preferably arranged so that the head 31 which has parallel sides is at a slight inclination to the horizontal.

A bracket 32 is secured to the pipe and carries a cage 33 with a bridge 34 therein. This cage preferably has a tapered portion 35 and the bridge having an aperture with a ball 36 fitted thereon, there being a closure cap 37 for the top of the cage. A trigger 38 is mounted on a pivot 39 on part of the cage and has a striker end 40 inside the cage and a hook-shaped detent 41 on the outside of the cage, this engaging with a catch 42 on the counter-weight arm 43 and having a heavy counter-weight 44 on the outer end. The counter-weight arm has an eye 45 surrounding the head 41, this eye having opposite lugs 46 designed to engage the head.

It will be noted that these lugs are arranged so that when the trigger is released by the ball being shaken loose off the bridge and dropping on the striker end, releasing the trigger from the catch, that the counter-weight has a certain drop, swinging the counter-weight lever before the lugs 46 engage the head 31. Thus, even should this valve stick to a certain extent by being left continually open year after year, the sudden jolt given by the heavy weight will loosen the valve and allow same to be closed by the weight swinging downwardly.

The construction for shutting off electric power alone or for shutting off electric power and at the same time shutting off a pipe service either liquid or gaseous, is illustrated particularly in Figs. 10 and 11. In this case a cone 50 of electric conducting material illustrated as having a circular rim 51 is mounted in a suitable structure and has a central aperture 52 in the top on which a ball 53 is seated. Insulating bars 54 extend upwardly from the rim 51 and support an upper ring 55 also of electric conducting material. The circuit for electric power shut off is substantially as follows:

Two electric circuit wires are indicated being designated by the numerals 56 and 57, having fuses 58 and leads 59 to some suitable service as in a house or to a building or location. A lead 60 extends from one of the fuses to a terminal 61 on the conducting cone, this being secured to the rim 51. The lead 62 from the other fuse is connected to a terminal 63 on the upper ring 55.

When the ball is shaken off the aperture or resting support on the cone, it rolls down same and makes an electric closure between the cone and the upper ring 55. This makes a short circuit between the leads 60 and 62 connected to the fuses and blows out the fuses.

If it is desired to have the same or a similar device shut-off a pipe service for liquid or gas, the construction may be substantially as follows:

The pipe indicated by the numeral 64 has a valve 65 therein opened and closed by an electric motor device 66. In this case one branch of an additional circuit is indicated by the numeral 67 being connected to a terminal 68 on the ring part 51 of the cone. The other side 69 of the circuit is connected to a terminal 70 on the upper ring 55. This side or wire 69 is connected to the motor and there is a connection lead 71 to the ground or return to the second source of power.

Thus when the ball is shaken from its resting place and forms a bridge between the cone and the ring 55, it closes the circuit between the wires 67 and 69 leading to the electric motor, thus causing same to operate and shut off the valve 65. This may be utilized for shutting off either gas or liquid service and there can be a number of valves in different services controlled by the same short-circuiting or circuit making device above described.

From the above description considered with the drawings, it is apparent that a large number of different devices may be constructed to shut off service pipes for liquid or gas due to vibration caused by earthquakes, explosions or other severe disturbances. Also that many types of devices may be made for breaking or short-circuiting electric circuits due to the same causes and also for closing electric circuits to electrically actuate the valves for shutting off liquid or gas service.

It is therefore apparent that my invention may be changed materially in general construction or in specific details. Such changes would be within the spirit of my invention as set forth in the description, drawings and claims.

Having described my invention, what I claim is:

1. A pipe shut-off comprising in combination pipes having a valve, a freely movable weight, means supporting same, the supporting means being adapted to drop the weight on a disturbance in any direction, or shock in any direction, and means to close the valve by the weight.

2. A shut-off comprising in combination a structure having pipes for gas or liquid, a valve controlling said pipes, a freely movable weight, means to support same in a stable condition, said means allowing the weight to drop on a disturbance in any direction, or shock in any direction, said weight closing the valve.

3. A pipe shut-off having a valve structure, a bridge supporting a freely movable weight, said bridge being adapted to allow dropping of the weight on shock in any direction, or disturbance in any direction, to close the valve.

4. A pipe shut-off comprising pipes having a valve structure connected thereto, a bridge, a freely movable ball supported directly on the bridge, the bridge retaining the ball when stationary and dropping the ball on a disturbance in any direction, or shock in any direction, said ball closing the valve.

5. A pipe shut-off comprising a plurality of pipes, a structure having a valve seat connecting said pipes, means supporting a valve element in relation to the seat, said means allowing movement of the valve element on a vibrating shock in any direction, or a tilting disturbance in any direction, to form a closure against the valve seat.

6. A pipe shut-off comprising in combination a plurality of pipes, a structure having a valve seat connecting said pipes, a valve closure element, means supporting said element above the valve seat, said supporting means being adapted to drop the valve element on a tilting disturbance in any direction, or a vibrating shock in any direction, to form a closure against the seat.

7. A pipe shut-off comprising in combination a plurality of pipes, a conical shaped valve structure connected to said pipes having a valve seat adjacent the apex, a bridge in the valve structure directly supporting a freely movable ball, said bridge being adapted to drop the ball on a tilting disturbance in any direction, or a vibrating shock in any direction, the ball forming a closure against the seat.

8. A pipe shut-off comprising in combination a conical valve structure with the apex portion downwardly and forming a valve seat, an inlet pipe connected to the upper part of the valve structure, an outlet pipe connected adjacent the apex, a bridge extending across the upper part of the valve structure leaving open spaces on each side and below the bridge, means to support a freely movable ball directly thereon, said means allowing the ball to drop over the side of the bridge on a tilting disturbance in any direction, or a vibrating shock in any direction, the ball forming a closure against the said seat.

In testimony whereof I have signed my name to this specification.

ARTHUR H. BRANTON.